(12) United States Patent
Kanerva et al.

(10) Patent No.: US 7,340,246 B1
(45) Date of Patent: Mar. 4, 2008

(54) TRANSMISSION OF INFORMATION DURING CALL ESTABLISHMENT

(75) Inventors: Mikko Kanerva, Helsinki (FI); Liisa Kuoppamäki, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/568,927

(22) Filed: May 11, 2000

Related U.S. Application Data

(63) Continuation-in-part of application No. PCT/FI98/00896, filed on Nov. 16, 1998.

(30) Foreign Application Priority Data

Nov. 17, 1997 (FI) .................................. 974259

(51) Int. Cl.
H04M 3/42 (2006.01)

(52) U.S. Cl. ...................... 455/415; 455/461; 455/466; 379/84; 379/67.1

(58) Field of Classification Search ............... 455/415, 455/425, 461, 466; 379/84, 85, 67.1, 69, 379/676.1
See application file for complete search history.

(56) References Cited

U.S. PATENT DOCUMENTS

| | | | |
|---|---|---|---|
| 5,301,035 A * | 4/1994 | Hayafune ................. 358/440 |
| 5,390,233 A * | 2/1995 | Jensen et al. .............. 455/417 |
| 5,535,263 A | 7/1996 | Blumhardt ................... 379/67 |
| 5,555,446 A * | 9/1996 | Jasinski ...................... 340/7.21 |
| 5,600,703 A * | 2/1997 | Dang et al. ................ 340/7.22 |
| 5,842,128 A * | 11/1998 | Kito et al. ................ 455/435.1 |
| 5,864,606 A * | 1/1999 | Hanson et al. ........... 379/88.18 |
| 5,940,484 A * | 8/1999 | DeFazio et al. ........ 379/142.06 |
| 6,002,749 A * | 12/1999 | Hansen et al. ................ 379/52 |
| 6,041,103 A * | 3/2000 | La Porta et al. ............ 379/67.1 |
| 6,052,438 A * | 4/2000 | Wu et al. .................. 379/67.1 |
| 6,088,343 A * | 7/2000 | King ........................... 370/329 |
| 6,192,218 B1 * | 2/2001 | Laufmann et al. ......... 340/7.53 |
| 6,229,880 B1 * | 5/2001 | Reformato et al. ....... 379/88.01 |
| 6,816,723 B1 * | 11/2004 | Borland .................... 455/412.1 |

FOREIGN PATENT DOCUMENTS

| EP | 0 510 411 A2 | 10/1992 |
|---|---|---|
| EP | 0 604 901 | 7/1994 |

(Continued)

OTHER PUBLICATIONS

Mouley, et al., "GSM 04.08 Version 5.4.0", *The GSM System for Mobile Communications*, 4 pgs., Nov. 1996.

(Continued)

*Primary Examiner*—Nghi H. Ly
(74) *Attorney, Agent, or Firm*—Squire, Sanders & Dempsey L.L.P.

(57) ABSTRACT

The present invention relates to a method for transmitting information to a subscriber in a telephone system in connection with call establishment. In order to achieve more efficient transmission of information between the parties participating in the call establishment, a message designated for a predetermined subscriber or a group of subscribers is stored in a memory means, whereby in connection with the call establishment another party to the call establishment is identified, the message designated for the identified party is retrieved from the memory means, and said message is sent to the identified party in connection with the call establishment.

15 Claims, 3 Drawing Sheets

FOREIGN PATENT DOCUMENTS

| | | |
|---|---|---|
| EP | 0 631 452 | 12/1994 |
| EP | 0 802 661 | 10/1997 |
| EP | 0 818 913 | 1/1998 |
| EP | 0 729 258 | 8/1998 |
| GB | 2 322 036 | 8/1998 |
| JP | 08289022 | 11/1996 |

OTHER PUBLICATIONS

International Search Report for PCT/FI98/00896, no date.

* cited by examiner

TRANSMISSION OF INFORMATION DURING CALL ESTABLISHMENT

CROSS-REFERENCE TO RELATED APPLICATIONS

This is a continuation in part of PCT/FI98/00896, filed 16 Nov. 1998.

BACKGROUND OF THE INVENTION (1) Field of Invention

The present invention relates to a method for transmitting information to a subscriber in a telephone system in connection with call establishment. The invention further relates to a cellular radio system comprising mobile stations and means for establishing a call to the mobile stations over a radio path. The invention further relates to a mobile station comprising means for establishing a telecommunication connection to the other parts of the system by radio-frequency signals.

The present invention relates particularly to transmitting information between subscribers in cellular radio systems although the invention can also be applied to a fixed telephone network. In the following, however, the invention will be described by way of example with reference to cellular radio systems.

(2) Description of Related Art

In the known cellular radio systems, the possessor of a mobile station can, for example at a meeting, set his or her mobile station in a silent mode in which its ringing tone is muted. A caller, i.e. an A subscriber, placing a call to a mobile station which is in the silent mode is not, however, provided with any information about this until the possessor of the mobile station, i.e. a B subscriber, answers the call terminating at him or her. In such a situation, since it may take longer than usual before the call is answered, the A subscriber may run out of patience and stop the call attempt before the B subscriber has the time to answer.

Cellular radio systems are previously known in which an A-subscriber-identifier is transmitted to the B subscriber in connection with a terminating call. The B subscriber can identify the connection from which the call is being placed to him or her, i.e. in practice the number of the caller, on the basis of the A-subscriber-identifier. A disadvantage of these known solutions is, however, that the identification of the A subscriber succeeds only if the A-subscriber-identifier transmitted to the B subscriber is previously known to him or her, and if the caller is the person who normally uses the particular phone. In other words, since the identification of the A subscriber is specifically based on the identification of the connection, the identification does not succeed if somebody else uses that phone.

BRIEF SUMMARY OF THE INVENTION

An object of the present invention is to solve the problems of the known solutions mentioned above and provide a solution which is more user-friendly and more efficient in transmitting information between the parties participating in a call. These objects can be achieved by the method of the invention, which is characterized by storing in a memory means a message designated for a predetermined subscriber or a group of subscribers, whereby in connection with the call establishment: another party to the call establishment is identified, the message designated for the identified party is retrieved from the memory means, and said message is sent to the identified party in connection with the call establishment.

The invention further relates to a system in which the method of the invention can be applied. The system of the invention is characterized in that the system comprises at least one mobile station comprising means for storing in a memory means a message designated for a predetermined subscriber or a group of subscribers, identification means for identifying another party to the call establishment, and transmission means responsive to the identification means for sending the message stored for the identified party in the memory means to the identified party in connection with the call establishment.

The invention further relates to a mobile station by which the method of the invention can be applied and which is suited for use in the system of the invention. The mobile station of the invention is characterized in that the mobile station comprises means for storing in a memory means a message designated for a predetermined subscriber or a group of subscribers, identification means for identifying another party to the call establishment, and transmission means responsive to the identification means for retrieving from the memory means the message designated for the identified party and sending the message to the identified party in connection with the call establishment.

The invention is based on the idea that a telephone system, for example a cellular radio system, becomes significantly more user-friendly when the possessor of the telephone is able to store in the memory means personal messages, such as notes and/or greetings, which are sent in connection with the call establishment to persons defined by the possessor of the telephone. In other words, at a meeting, for example, the possessor of a mobile station can store in his or her mobile station a note indicating when the meeting probably ends. In addition, the possessor of the mobile station can define to whom that information is transmitted. The message used can consist of text, sound (such as speech for instance), a graphical image or of a video clip. The method of the invention also enables the user of the mobile station to store a greeting which is sent in connection with the call establishment of an initiating call. This is useful when, for example, the user places a call from somebody else's telephone and still wants to indicate the caller to the B subscriber. In such a case, he or she can store, for example, an initial greeting which includes his or her name in the memory of the telephone.

The possessor of the mobile station can store a message in his or her mobile station in text form, for example. The message can then be transmitted to the display of the receiver's telephone in text form. Alternatively, the receiver's telephone can be equipped with a speech synthesizer which converts the received message in text form into speech. Also, a network element of a telephone system can have a speech synthesizer which converts a message in text form into speech and forwards it to the receiver. This enables, for example, a message to be sent also to a telephone in an analogue telephone network. In such a case, the network element in question can include, for example, standard messages stored by the operator, the transmitter only being required to transmit from his or her telephone the number of a standard message, on the basis of which the network element knows which speech message it should send to the receiver.

According to the invention, the memory in which a message is stored can be located in the telephone, in a peripheral of the telephone or, for example, on an SIM card of a mobile station. Alternatively, the memory can be placed in a network element of the telephone system, for example in connection with a telephone exchange, in which case the user can store in advance the desired messages and receiver information in the network element in question via his or her telephone or a PC terminal, for example.

In a preferred embodiment of the method in accordance with the invention, a message is stored in a memory means, a receiver is defined for the message, and a subscriber or a group of subscribers associated with the message is defined, whereby in connection with the call establishment: another party to the call establishment is identified, the message associated with the identified party is retrieved from the memory means, and the message is sent to the receiver defined for the message. This embodiment of the invention enables a message to a separately defined receiver to be simultaneously sent in connection with a call placed to a specific subscriber. This is useful in connection with emergency calls, for example. In such a case, a blood group, health data or a registration number of a car, for example, can be stored in the memory means in such a manner that the information in question is transmitted to an emergency centre when a call is placed from the telephone to a national emergency number. In addition to the information stored in the memory, the mobile station can be programmed to transmit its location coordinates with the message, for example.

Hence, the most significant advantages of the solution of the invention are improved user-friendliness since the user can store in memory personal messages and define to whom the messages in question are sent, and the fact that the invention can also be applied in the existing cellular radio systems with extremely small modifications (mainly relating to the software in mobile stations).

The preferred embodiments of the method, cellular radio system and mobile station of the invention are disclosed in the attached dependent claims 2 to 4, 6 and 8 to 10.

BRIEF DESCRIPTION OF THE DRAWINGS

The invention will be described in closer detail in the following by means of a preferred embodiment of the invention with reference to the accompanying drawings, in which.

DESCRIPTION OF THE PREFERRED EMBODIMENTS

Figure 1:
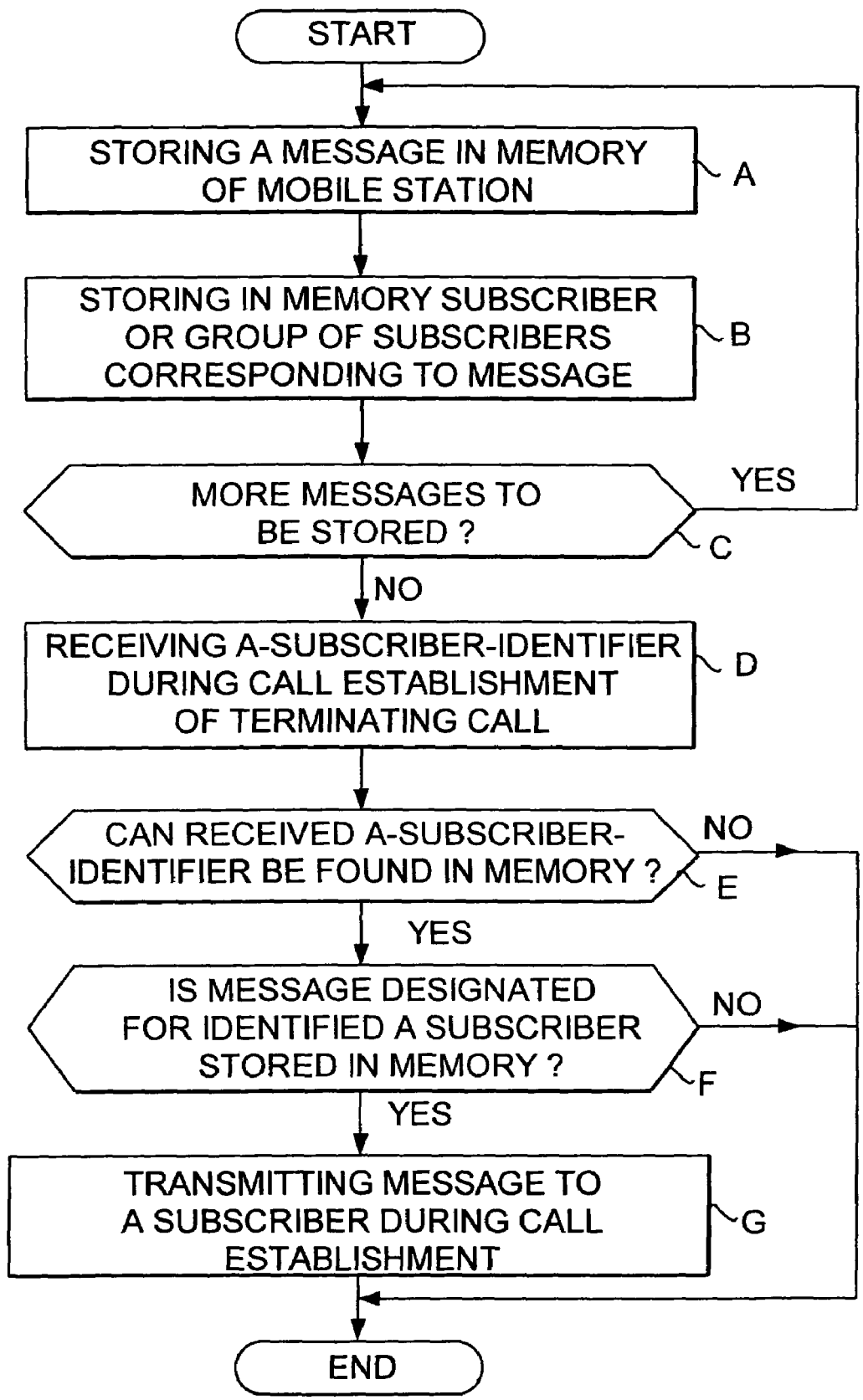
FIG. 1 is a flow diagram of a first preferred embodiment of the method in accordance with the invention.

FIG. 1 is a flow diagram of a first preferred embodiment of the method in accordance with the invention. In the following, it is assumed by way of example that the invention is applied particularly in a cellular radio system, in a GSM system, for example.

In blocks A and B of FIG. 1, the possessor of a mobile station stores messages in the memory of the mobile station. The messages can be text messages, for example, and the mobile station can store them in memory locations assigned to short messages or, alternatively, in memory locations specifically reserved for this purpose. A receiver, i.e. a subscriber or a group of subscribers, for which the message in question is designated is defined for each stored message.

In addition, a plurality of messages can be stored for each receiver if desired. Receivers can be defined, for example, in such a manner that for each receiver, his or her telephone number is stored, whereby the identification of the receiver in question takes place particularly on the basis of the telephone number.

When the messages are stored in the memory of the mobile station and the mobile station is about to receive a terminating call in block D, the mobile station receives an A-subscriber-identifier over a radio path in a manner known per se.

In block E, the received A-subscriber-identifier is compared with the information stored in the memory of the mobile station. The A-subscriber-identifier transmitted by the network can consist of the number of a caller or, alternatively, the name of a caller, for example. If the A subscriber can then be identified, the process passes to block F in which it is checked whether the user of the mobile station has defined a message designated for the A subscriber in question. If such a message can be found, it is sent to the A subscriber in block G in connection with the call establishment.

If it is established in blocks E and F that the A-subscriber-identifier cannot be found in the memory of the mobile station, or no message has been defined for the A subscriber in question, it can next be checked, as distinct from the block diagram, whether the user has stored a message for these cases. If so, the message is sent to the A subscriber.

When the invention is applied in a GSM cellular radio system, the message stored in memory can be sent, for example, by a USER-TO-USER element according to part 04.08 of the GSM specifications, included in a SETUP, ALERTING, CONNECT, DISCONNECT, RELEASE or RELEASE COMPLETE message.

In accordance with the invention, the user of the mobile station can, as distinct from the case in FIG. 1, further define text messages dependent on the mode of the mobile station for a specific receiver. Such possible modes into which the user of the mobile station can program it include "At a meeting" and "On vacation", in which case for the same receiver a different message can be defined for each mode. For example, for subscriber NN a message "At a meeting till 2 pm" can be stored for the Meeting mode, and a message "I'm on vacation, on business call Mr X, tel. 123 456" can be stored for the Vacation mode.

Figure 2:
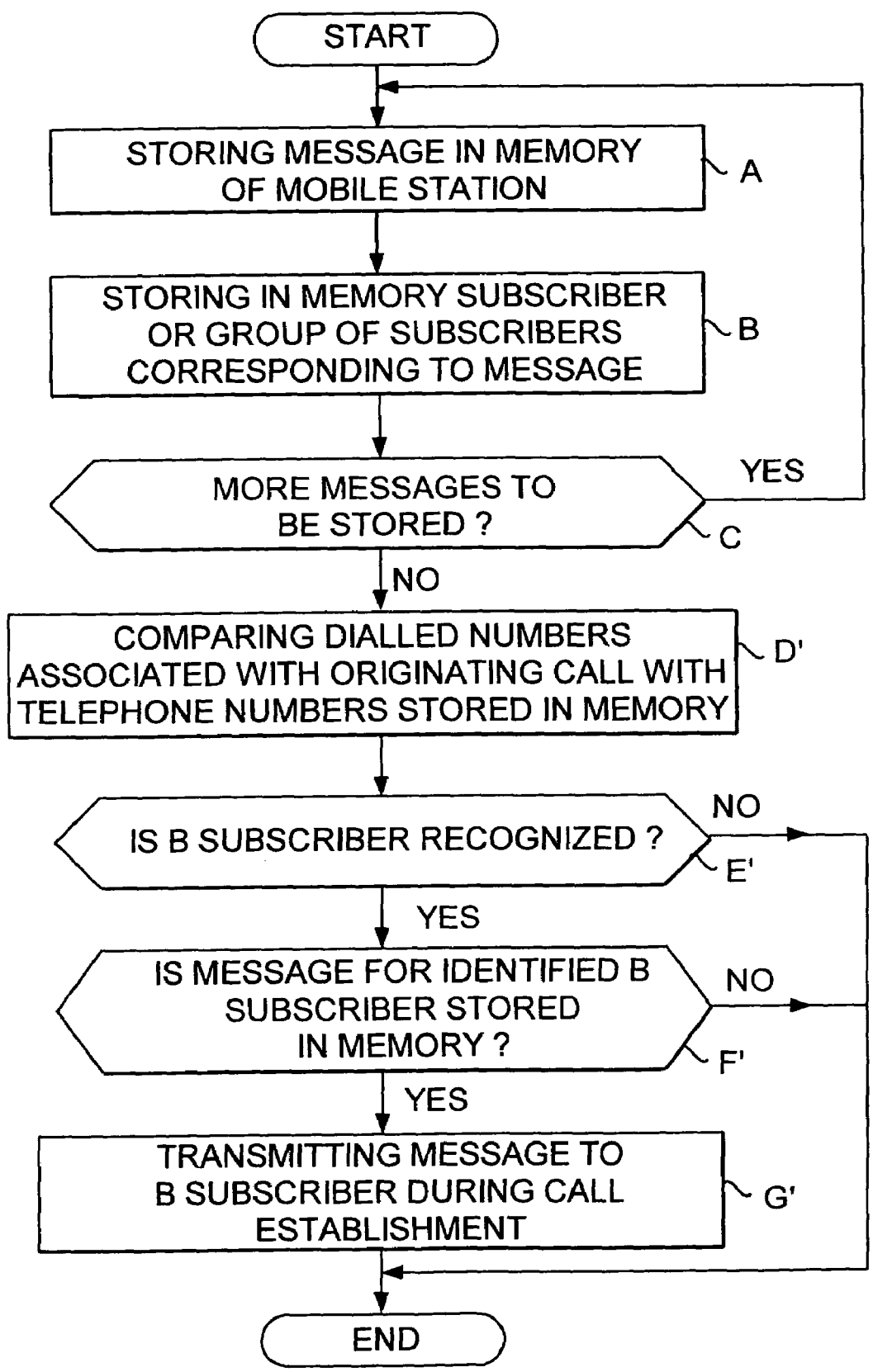
FIG. 2 is a flow diagram of another preferred embodiment of the method in accordance with the invention.

FIG. 2 is a flow diagram of another preferred embodiment of the method in accordance with the invention. The embodiment of FIG. 2 deviates from the embodiment of FIG. 1 in that in the case of FIG. 2, the mobile station is programmed to send messages in connection with call establishment. In other words, when a call is made on the mobile station, it checks whether a message has been defined for the B subscriber in question, and if so, it sends the message in connection with the call establishment.

Blocks A to C of FIG. 2 correspond to blocks A to C of FIG. 1. In block D' a B-subscriber-identifier of an outgoing call is compared with the information stored in the memory of the mobile station. This can be carried out by comparing the number of the outgoing call with the numbers stored in the memory or, alternatively, by comparing the name of the receiver of the outgoing call with the names stored in the memory. If the identifier of the B-subscriber can be found in the memory, this means that the B subscriber has been identified, and the process passes via block E' to block F' in which it is checked in the memory whether a greeting message for the subscriber in question has been stored in it, i.e. a message which is sent in connection with an initiating call. If such a message can be found, it is sent to the B subscriber in block G' in connection with the call establishment.

Figure 3:
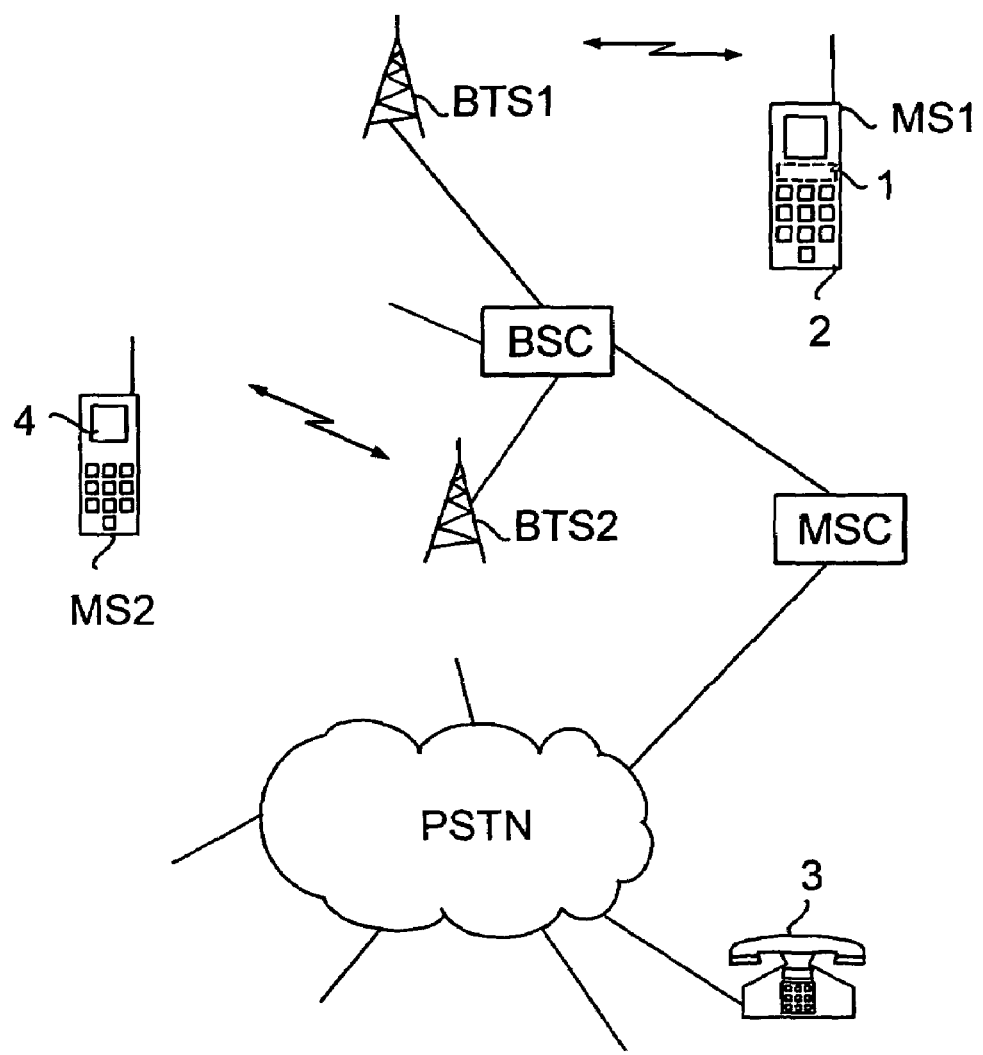
FIG. 3 is a block diagram of a first preferred embodiment of the cellular radio system in accordance with the invention.

FIG. 3 is a block diagram of a first preferred embodiment of the cellular radio system in accordance with the invention. The cellular radio system shown in FIG. 3 can be a GSM system (Global System for Mobile communications), for example.

On the SIM (Subscriber Identity Module) card 1 of a mobile station MS1 shown in FIG. 3, a memory is arranged in which the user of the mobile station can, via a keypad 2, store text messages and information indicating for whom the messages in question are designated. For example, before a meeting the user can store in the memory a message "At a meeting till about 2 pm" and define as a group of receivers all subscribers whose telephone numbers the user has stored in the memory of his or her telephone.

If a mobile station MS2 of the cellular radio system places a call to the mobile station MS1, the A-subscriber-identifier of the mobile station MS2 is transmitted to the mobile station MS1 via a base station BTS1, a mobile services switching centre MSC and a base station controller BSC in connection with the call. The mobile station MS1 then checks whether the A-subscriber-identifier transmitted from the network can be found in its memory. If so, the mobile station MS1 adds the found message to, for example, a USER-TO-USER element of an ALERTING message according to part 04.08 of the GSM specifications. The message in question is then transmitted to the mobile station MS2 in which it is shown for example in text form on a display 4 of the mobile station MS2. Alternatively, the mobile station MS2 can comprise means for producing sound signals via a speaker in response to the message, or even a speech synthesizer, whereby it can generate a speech message via its speaker from a text message received. On the basis of the message, the user of the mobile station MS2 is informed of the user of the mobile station MS1 having a meeting and thus being unable to answer his or her telephone, at least immediately. It is more meaningful to the user of the mobile station MS2 that the call is possibly connected to an answering machine (or interrupted) after this, instead of being directly connected to the answering machine since now the caller at least knows why the user of the mobile station MS1 did not answer and when it might be worth calling again.

In accordance with the invention, also messages associated with calls originating from the mobile station in question can be stored in the memory of the mobile station MS1. Hence, if the user of the mobile station MS1 is placing a call to, for example, a subscriber terminal 3 of a fixed network via a public switched telephone network, the mobile station MS1 compares the dialled numbers associated with the originating call with the telephone numbers stored in the memory of the mobile station. If the number can be found, the mobile station MS1 transmits an initial greeting stored for the subscriber 3 in its memory to the subscriber terminal 3 in a USER-TO-USER element of a SETUP message according to part 04.08 of the GSM specifications, for example. Provided that all network elements between the mobile station MS1 and the telephone 3 support the forwarding of the USER-TO-USER element (the exchange of the fixed network can be an ISDN exchange, for example), the message sent by the mobile station MS1 is then transmitted to the display of the telephone 3 simultaneously when the telephone 3 rings.

It is to be understood that the description above and the accompanying figures are only intended to illustrate the present invention. It will be obvious to those skilled in the art that the invention can be varied and modified in many ways without departing from the scope and spirit of the invention disclosed in the attached claims.

The invention claimed is:

1. A method for transmitting information to a subscriber in a telephone system in connection with call establishment between two subscribers, comprising:

storing in a memory of a subscriber station a plurality of messages and for each message information identifying a designated receiver to whom said message may be transmitted, said designated receiver consisting of a predetermined subscriber or a group of subscribers, and in connection with call establishment, after said storing in connection with call establishment identifying another party to the call establishment by comparing a dialed number associated with an initiating call or a name of a receiver of an initiating call with information stored in the memory as information identifying the designated receivers;

searching the content of said memory in order to identify a message for which said another party is the designated receiver;

in response to identifying a message for said another party retrieving said identified message; and sending the message to the identified party in connection with call establishment.

2. The method as claimed in claim 1, wherein the message includes at least one of text, sound, a graphical image and a video clip.

3. A cellular radio system comprising:

mobile stations; and means for establishing a call to the mobile stations over a radio path, at least one of the mobile stations comprising:

means for storing in a memory means of a mobile station a plurality of messages and for each message information identifying a designated receiver to whom said message may be transmitted, said designated receiver consisting of a predetermined subscriber or a group of subscribers;

identification means for identifying another party to a call establishment between two subscribers by comparing a dialed number associated with an initiating call or a name of a receiver of an initiating call with information stored in the memory means as information identifying the designated receivers; and transmission means responsive to the identification means for, as a response to the identification of said another party, sending a message, which has been stored in the memory means before initiation of said call establishment, to the identified party in connection with call establishment, if the information stored in the memory means for said message indicates that the identified party is the designated receiver of the message.

4. The system as claimed in claim 3, wherein the system is a GSM cellular radio system, and the message consists of a text message stored in a mobile station in one of a peripheral or an SIM card, and the mobile station is arranged to send the message in a USER-TO-USER element of one of a SETUP, ALERTING, CONNECT, DISCONNECT, RELEASE and RELEASE COMPLETE message according to part 04.08 of GSM specifications.

5. A mobile station comprising:

means for establishing a telecommunication connection to other parts of a system by radio-frequency signals;

means for storing in a memory means of said mobile station a plurality of messages and for each message information identifying a designated receiver to whom said message may be transmitted, said designated receiver consisting of a predetermined subscriber or a group of subscribers;

identification means for identifying another party to a call establishment between two subscribers by comparing a dialed number associated with an initiating call or a name of a receiver of an initiating call with information stored in the memory means as information identifying the designated receivers; and transmission means responsive to the identification means for, as a response to the identification of said another party, retrieving from the memory means a message, which has been stored in the memory means before initiation of said call establishment, and for sending the message to the identified party in connection with call establishment, if the information stored in the memory means for said message indicates that the identified party is the designated receiver of the message.

6. The mobile station as claimed in claim 5, further comprising means for receiving an A-subscriber-identifier transmitted over a radio path in connection with a terminating call, and wherein the identification means are arranged to identify another party to the call establishment by comparing the received A-subscriber-identifier with subscriber identifiers stored in the memory means as information identifying the designated receivers, and the transmission means are arranged to send a subscriber identified by the identification means a text message stored in the memory means.

7. The mobile station as claimed in claim 5, wherein the mobile station is arranged to enter one of at least two alternative modes, to store in the memory means for each alternative mode a plurality of messages and for each message information identifying a designated receiver, and the transmission means are arranged to send a message stored in the memory means to a subscriber identified by the identifying means, if the mobile station is in the mode for which the message has been stored, and if the information stored for the message indicates that the identified subscriber is the designated receiver.

8. The mobile station as claimed in claim 5, wherein the transmission means are arranged to send a text message stored in the memory means for an identified party to the identified party in connection with call establishment.

9. A method for transmitting information to a subscriber in a telephone system in connection with call establishment between two subscribers, comprising:

storing in a memory of a mobile station a plurality of messages and for each message information identifying a designated receiver to whom said message may be transmitted, said designated receiver consisting of a predetermined subscriber or a group of subscribers;

after said storing, identifying in connection with call establishment another party to the call establishment by comparing a dialed number associated with an initiating call or a name of a receiver of an initiating call with information stored in the memory as information identifying the designated receivers; and retrieving, in response to identifying a message for said another party, a message associated with the identified party from the memory, and transmitting the message to the identified party, if the information stored for the message indicates that the identified party is the designated receiver.

10. A cellular radio system comprising:

mobile stations; and an establishing unit configured to establish a call to the mobile stations over a radio path, wherein at least one of the mobile stations comprise a storing unit configured to store in a memory of a mobile station a plurality of messages and for each message information identifying a designated receiver to whom said message may be transmitted, said designated receiver consisting of a predetermined subscriber or a group of subscribers;

an identification unit configured to identify another party to a call establishment between two subscribers by comparing a dialed number associated with an initiating call or a name of a receiver of an initiating call with information stored in the memory as information identifying the designated receivers; and a transmitting unit configured to, as a response to the identification of said another party, send a message, which has been stored in the memory before initiation of said call establishment, to the identified party in connection with call establishment, if the information stored in the memory for said message indicates that the identified party is the designated receiver of the message.

11. The system as claimed in claim 10, wherein the system is a GSM cellular radio system, and the message consists of a text message stored in a mobile station in one of a peripheral or an SIM card, and the mobile station is configured to send the message in a USER-TO-USER element of one of a SETUP, ALERTING, CONNECT, DISCONNECT, RELEASE and RELEASE COMPLETE message according to part 04.08 of GSM specifications.

12. A mobile station comprising:

an establishing unit configured to establish a telecommunication connection to other parts of a system by radio-frequency signals;

a storing unit configured to store in a memory of said mobile station a plurality of messages and for each message information identifying a designated receiver to whom said message may be transmitted, said designated receiver consisting of a predetermined subscriber or a group of subscribers;

an identification unit configured to identify another party to a call establishment between two subscribers by comparing a dialed number associated with an initiating call or a name of a receiver of an initiating call with information stored in the memory as information identifying the designated receivers; and a transmitting unit configured to, as a response to the identification of said another party, retrieve from the memory means a message, which has been stored in the memory means before initiation of said call establishment, and to send the message to the identified party in connection with call establishment, if the information stored in the memory for said message indicates that the identified party is the designated receiver of the message.

13. The mobile station as claimed in claim 12, further comprising a receiving unit configured to receive an A-subscriber-identifier transmitted over a radio path in connection with a terminating call, and wherein the identification unit is further configured to identify another party to the call establishment by comparing the received A-subscriber-identifier with subscriber identifiers stored in the memory as information identifying the designated receivers, and the transmitting unit is further configured to send a subscriber identified by the identification unit a text message stored in the memory.

14. The mobile station as claimed in claim 12, wherein the mobile station is configured to enter one of at least two alternative modes, to store in the memory for each alternative mode a plurality of messages and for each message information identifying a designated receiver, and the transmitting unit is further configured to send a message stored in the memory to a subscriber identified by the identification unit, if the mobile station is in the mode for which the message has been stored, and if the information stored for the message indicates that the identified subscriber is the designated receiver.

15. The mobile station as claimed in claim 12, wherein the transmitting unit is further configured to send a text message stored in the memory for an identified party to the identified party in connection with call establishment.

* * * * *